United States Patent
Bourcier et al.

(10) Patent No.: US 8,840,859 B2
(45) Date of Patent: Sep. 23, 2014

(54) SILICA EXTRACTION FROM GEOTHERMAL WATER

(75) Inventors: William L. Bourcier, Livermore, CA (US); Carol J. Bruton, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 688 days.

(21) Appl. No.: 12/203,250

(22) Filed: Sep. 3, 2008

(65) Prior Publication Data
US 2009/0081105 A1  Mar. 26, 2009

Related U.S. Application Data

(60) Provisional application No. 60/995,355, filed on Sep. 25, 2007.

(51) Int. Cl.
*C01B 33/12* (2006.01)
*C01B 33/00* (2006.01)
*D21H 17/00* (2006.01)
*D21H 19/00* (2006.01)
*D21H 17/68* (2006.01)

(52) U.S. Cl.
USPC .......................................... 423/339; 423/335

(58) Field of Classification Search
USPC .................................................. 423/335, 339
See application file for complete search history.

(56) References Cited

U.S. PATENT DOCUMENTS

| | | |
|---|---|---|
| 5,200,165 A | 4/1993 | Harper et al. |
| 5,595,717 A | 1/1997 | Harper et al. |
| 6,949,193 B2 * | 9/2005 | Duke et al. .................... 210/652 |

FOREIGN PATENT DOCUMENTS

EP    0396242 A2    11/1990

OTHER PUBLICATIONS

Ning (Desalination 2002, 151:67-73).*
McBride, Sr. et al. (Ultrapure water, 1997, 14:24-29).*
E.A. Burton, et al, "Silica Scale Management: Lowering Operating Costs through Improved Scale Control, and Adding Value by Extracting Marketable by-products." Geothermal Resources Council Transactions, vol. 27, Oct. 12, 2003, Oct. 15, 2003 pp. 519-522, XP008121131.

* cited by examiner

*Primary Examiner* — Jun Li
(74) *Attorney, Agent, or Firm* — Eddie E. Scott

(57) ABSTRACT

A method of producing silica from geothermal fluid containing low concentration of the silica of less than 275 ppm includes the steps of treating the geothermal fluid containing the silica by reverse osmosis treatment thereby producing a concentrated fluid containing the silica, seasoning the concentrated fluid thereby producing a slurry having precipitated colloids containing the silica, and separating the silica from the slurry.

3 Claims, 1 Drawing Sheet

US 8,840,859 B2

SILICA EXTRACTION FROM GEOTHERMAL WATER

CROSS-REFERENCE TO RELATED APPLICATIONS

This application claims the benefit of U.S. Provisional Patent Application No. 60/995,355 filed Sep. 25, 2007 and titled "silica extraction from geothermal water." U.S. Provisional Patent Application No. 660/995,355 filed Sep. 25, 2007 and titled "silica extraction from geothermal water" is incorporated herein by this reference.

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to silica extraction and more particularly to silica extraction from geothermal water.

2. State of Technology

U.S. Pat. No. 5,200,165 for controlled precipitation of amorphous, silica from geothermal issued to Ross T. Harper et al Apr. 6, 1993 provides the following state of technology information: "amorphous silicas are differentiated by structure into three classifications; namely, TYPES I, II and III. Type I silica, defined here, is precipitated from geothermal water. This silica is commonly sourced for commercial use by acid treatment of sodium silicate solutions prepared for example, by the digestion of quartz sand with sodium hydroxide. Type II and III silicas, defined here, may be precipitated from geothermal water or an alternate aqueous source. This alternative feedstock fluid should contain sufficient initial silicic acid and or silicate ion to allow controlled precipitation as described for geothermal water in this patent. Type II precipitated silica is similar in structure to a class of commercial silicas normally prepared under anhydrous conditions, known as pyrogenic "arc" silicas. The "arc" process involves the oxidation of silicon monoxide [SiO] at very high temperatures under anhydrous conditions. Geothermal water is normally characterized as being slightly acidic to neutral to slightly alkaline with significant concentrations of $SiO_2$, Na, K, Li, Ca, Mg, Rb, Cs, B, $SO_4$, Cl and dissolved gaseous species, e.g. $CO_2$, $H_2S$ and $NH_3$. Almost always, arsenic is present. A detailed chemical composition is shown in Table 8. Arsenic contamination of precipitated silicas from a geothermal source may or may not be a problem, depending on the end usage of the precipitated silica. Thus while in some applications procedures must be adopted whereby the arsenic contamination of silica is reduced, for others it may not be necessary. For example, where amorphous silica is being precipitated for paper coating or impregnation usage, preferably the arsenic concentration is low, e.g. less than 2 mg $kg^{-1}$ in the paper sheet."

U.S. Pat. No. 5,595,717 for controlled precipitation of amorphous silica from geothermal fluids or other aqueous media containing silicic acid issued to Ross T. Harper et al Jan. 21, 1997 provides the following state of technology information: "Moderate concentrations of silicic acid are present in hot, pressurized, aqueous, geothermal fluid as a result of the dissolution of silica containing minerals from the rock material in contact with the geothermally heated water while it is still underground. This fluid may be discharged from normal surface manifestations or may be produced artificially, from wells drilled into suitable formations, which increase mass withdrawal, for whatever purpose. Usually, the purpose of drilling geothermal wells and producing the hot geothermal fluid is to provide an energy source for the production of electric power. If silicic acid concentration in the water produced at the surface is sufficiently high, when the temperature or the pressure of the water is reduced, polymerization, with spontaneous homogeneous nucleation, of the siliceous values in the produced water results in the formation of critical size nuclei, which rapidly grow to form primary particles of silica. Spontaneous nucleation of the parent monomeric silicic acid species, and subsequent growth thereof by polymerization, forms polymeric primary silica particles which attain a physical dimension of about 1.5 nm."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method of producing silica from geothermal fluid containing low concentration of the silica of less than 275 ppm. The method includes the steps of treating the geothermal fluid containing the silica by reverse osmosis treatment thereby producing a concentrated fluid containing the silica, seasoning the concentrated fluid thereby producing a slurry having precipitated colloids containing the silica, and separating the silica from the slurry.

The present invention produces a fresh water by-product for evaporative cooling or other uses, and avoids the need for using potable water from other sources. The present invention also produces a fluid suitable for further extraction of other valuable metals and components because the dissolved constituents within it have been concentrated to higher levels, and also because silica, a potential fouling agent, has been removed. The silica extraction method can be modified to work at a variety of geothermal sites, in particular those having relatively low salinities where the fluids are amenable to reverse osmosis processing, and silica colloids can more readily remain dispersed.

The present invention can be used by geothermal power plants to (1) increase revenue by marketing a valuable by-product, (2) reduce or eliminate downstream silica scaling in fluids re-injection systems, and (3) to produce a saleable potable water stream. The colloidal silica can be sold in the available markets including molds for precision casting, as a strengthening agent in ceramics, as a binder for fibers, as a coating for paper, as an agent for frictionized surfaces, as a polishing agent for silicon wafers, and numerous other applications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
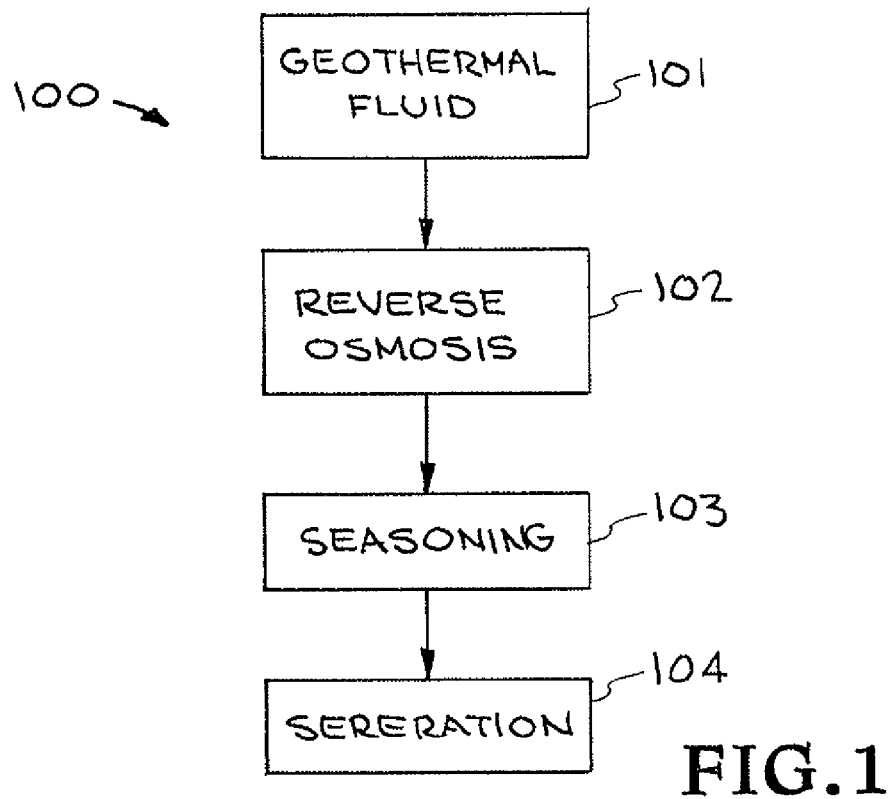
FIG. 1 illustrates one embodiment of a system of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Geothermal fluids contain significant concentrations of potentially valuable mineral resources. Although their mineral content was often considered more a nuisance than an asset, there is now increasing interest in improving the economics of geothermal energy by co-producing and marketing some of the dissolved constituents. Simple cost-effective methods are needed to extract mineral byproducts from geothermal fluids. Useful methods may have already been developed in the hydrometallurgical industry that could be modified for use with geothermal fluids. Although the enrichment of target elements in geothermal fluids is not as high as the enrichment in fluids commonly treated with hydrometallurgical methods, the costs associated with resource extraction from geothermal fluids are potentially low for several reasons:

Plant costs are split between power and mineral production. Geothermal power plants already pump and process the fluids. Mineral extraction would consist of an additional treatment step added to existing plant facilities;

There are no costs associated with mining and physical processing of the ore, and no negative environmental impacts;

There are no costs associated with dissolution of ore minerals into an aqueous phase because they are already in solution;

Geothermal systems process large volumes of water, commonly tens of millions of gallons per day, so that the mass of mineral resource is large in spite of relatively low concentrations.

Because of variability in the source of geothermal waters (e.g. meteoric or magmatic) fluid compositions are variable, with acidities ranging from pH 5 to 9, and salinities from 1000 to over 300,000 ppm total dissolved solids. Silica concentrations are generally controlled by strongly temperature dependent equilibration with silica polymorphs because the fluids are in equilibrium with rocks containing silica at depth.

Geothermal fluids are produced from subsurface reservoirs at depths commonly between 500 and 3000 meters. Their heat is extracted and used to generate power. The fluids are then reinjected into the subsurface to replenish the fluid reservoir. Resource removal optimally takes place after or near the end of the energy extraction process, but prior to reinjection. The temperatures of reinjected fluids are commonly between 50 and 150° C. and pressures at or slightly above steam saturation. In some cases, mineral extraction may allow further energy extraction that, without treatment, would be uneconomic due to scale formation. For example, the geothermal plants at Wairakei, New Zealand terminate energy extraction as the fluids cool to below 1300 C because silica scaling becomes too difficult to control (Brown, 2000, Proc. World Geothermal Congress p. 533). Silica extraction will allow additional energy extraction to lower temperatures. Mineral recovery also improves the economics of geothermal energy production by helping to minimize scaling both in the plant and in reinjection wells.

Many constituents of geothermal fluids have value provided they can be separated and purified. Previous published work on extraction of resources from geothermal fluids has focused on a wide variety of materials including precious and platinum group metals, zinc, lead, copper, manganese, rare earths, silica, lithium, arsenic, antimony, boron, bromine, iodine, strontium and barium sulfate, precipitated calcium carbonate, calcium chloride, potash, table salt, and sodium sulfate. Most of this work has focused on extraction of silica, lithium, and zinc. Typical recovery methods include acid leaching, biochemical leaching, evaporation and precipitation as sulfides.

Silica is an ubiquitous component of geothermal fluids and must be removed or reduced in concentration to allow other components to be removed. Most hydrothermal systems equilibrate with quartz ($SiO_2$) causing the fluids to have silica concentrations that reflect the temperature of the reservoir—the hotter the reservoir, the higher the silica concentration of the fluid.

During energy production, the geothermal fluid cools and some water is extracted as steam. Both processes cause the silica to become increasingly supersaturated. Eventually the silica tends to precipitate and form scale on various plant components or in reinjection wells. Silica will also tend to precipitate on mineral extraction processing equipment if not removed prior to mineral co-production. Thus a key need for mineral co-production is the elimination of silica scaling.

This problem can be avoided by purposefully precipitating silica with properties similar to those of commercially produced silicas. In this way the silica scaling problem is solved and at the same time a marketable silica by-product is produced. In addition, silica removal may allow additional energy extraction that would not be economic due to scaling problems.

Silica is a very versatile material. Its price varies widely depending on its purity and physical properties. The majority of marketed high surface area silicas are "precipitated silicas" that have been industrially produced by dissolving clean quartz sand in alkali solution, and then precipitating colloidal silica by acidification "Colloidal silicas" are generally produced by acidification using ion exchange resins to lower background salt content. By varying process conditions, silicas having a variety of textures can be produced. The silicas are used in applications in the rubber, plastics, paper, paint, cement, ceramics, pharmaceuticals, pesticides, and adhesive industries. Some specific uses include:

Desiccants and anti-caking agents in human and animal food,

Abrasives in sandpaper and for use in silicon wafer polishing,

Filler in plastics, paper, paint and rubber tires,

Fiber optics and catalyst manufacturing, and

Feedstock for making semiconductor silicon, fine chemicals, and chromatographic silica.

Most of the previous extraction studies have focused on flash plants (in which separated steam is used to drive the turbine) whereas our work is focused on mineral recovery at binary power plants (in which the geothermal fluid is used to heat a working fluid such as isobutene). Relative to flash plants, binary plants generally produce more water per unit of power produced, because they utilize cooler geothermal waters. For this reason, binary plants have the potential to be more favorably impacted by co-production. There is more mineral matter processed per kW-hr produced, and therefore the mineral value is higher relative to the value of produced energy.

Conventional methods for extracting silica are not effective for the certain geothermal fluids due primarily to slow kinetics of polymerization at low silica concentrations. A higher silica concentration is needed to allow efficient silica extraction. The geothermal fluids of the present invention have silica contents of around 250 ppm, whereas many other geothermal fluids contain silica contents of 500-1000 ppm silica.

Referring now to the drawings and in particular to FIG. 1, one embodiment of a system constructed in accordance with the present invention is illustrated. The system is designated generally by the reference numeral 100. The system 100 provides a method of producing silica from geothermal fluid 101 containing low concentration of the silica of less than 275 ppm. The method includes a number of steps. In step 102 the geothermal fluid 101 is treated by reverse osmosis treatment thereby producing a concentrated fluid containing the silica. In step 103 the concentrated fluid is seasoned thereby producing a slurry having precipitated colloids containing the silica. In step 104 the silica is removed from the slurry.

In one embodiment of the present invention, the step 102 of treating the geothermal fluid 101 containing the silica by reverse osmosis treatment involves treating the fluid and producing a concentrated fluid containing the silica at a concentration of between 600 and 900 ppm. The reverse osmosis treatment uses a reverse osmosis membrane to treat the geothermal fluid concentrating the silica at a concentration of between 600 and 900 ppm. The concentration of between 600 and 900 ppm avoids fouling said reverse osmosis membrane.

In another embodiment of the present invention, the step 103 of seasoning the concentrated fluid produces a slurry having precipitated colloids containing the silica of a marketable size between 10-100 nm. The seasoning step 103 can be accomplished by adjusting the pH of the concentrated fluid to produce a slurry having precipitated colloids containing the silica of a marketable size between 10-100 nm. The seasoning step 103 can be accomplished by adding chemicals to increase silica polymerization to produce a slurry having precipitated colloids containing the silica of a marketable size between 10-100 nm.

Figure 2:
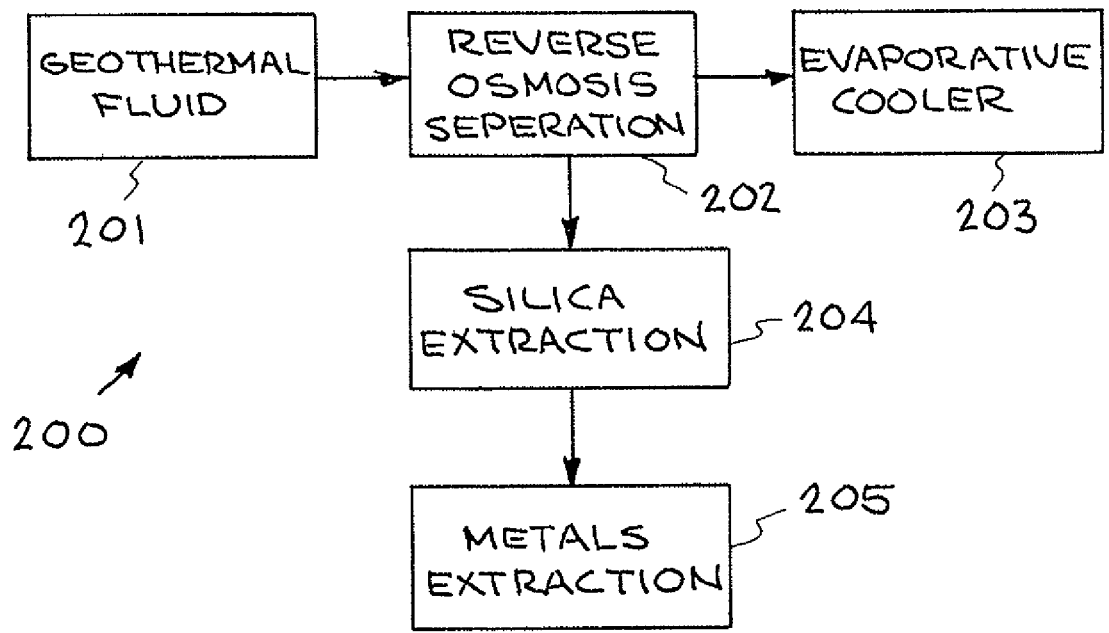
FIG. 2 illustrates another embodiment of a system of the present invention.

Referring now to FIG. 2, another embodiment of a system constructed in accordance with the present invention is illustrated. This embodiment of the system is designated generally by the reference numeral 200. The system 200 provides a method of producing silica from geothermal fluid 201 containing low concentration of the silica of less than 275 ppm. The method includes a number of steps. In step 202 the geothermal fluid 201 is treated by reverse osmosis treatment thereby producing a concentrated fluid containing the silica.

The step 202 of treating the geothermal fluid 201 by reverse osmosis treatment produces a concentrated fluid containing the silica and produces a fresh water by-product. In step 203 the fresh water by-product is used in an evaporative cooler.

In step 204 the silica is extracted from the slurry. In step 204 the concentrated fluid is seasoned thereby producing a slurry having precipitated colloids containing the silica. The slurry contains metal and in the step 205 the metal is removed from the slurry.

Mammoth Lakes Example

The present invention was tested at Mammoth Lakes, Calif. The geothermal fluid at Mammoth Lakes has one of the lowest salinities of any geothermal fluid (1200-1500 ppm salt), with very low calcium, and negligible iron and other metals. For this reason, the co-produced silica is of very high purity, and therefore may be useful in markets where high purity is necessary, such as colloidal silica for silicon chip polishing, precision casting, paper coatings, and raw silica for photovoltaics.

The present invention was used to extract silica at the Mammoth Lakes, Calif. geothermal plant funded by the U.S. DOE Geothermal Technologies Program, the California Energy Commission, and Mammoth Pacific L.P. The publication, *Proceedings of International Mineral Extraction from Geothermal Brines Conference*, September 2006, Tuscon, Ariz. describes this testing. The publication, *Proceedings of International Mineral Extraction from Geothermal Brines Conference*, September 2006, Tucson, Ariz. is incorporated herein by reference.

Applicants' testing of the present invention demonstrated that both precipitated and colloidal silica can be produced from the geothermal fluids at Mammoth Lakes by first concentrating the silica to over 600 ppm using reverse osmosis (RO). The RO permeate can be used in evaporative cooling at the plant; the RO concentrate is used for silica and potentially other resource extraction (Li, Cs, Rb). It is estimated that silica recovery at Mammoth Lakes could reduce the cost of geothermal electricity production by 1.00/kWh.

A problem with silica extraction at Mammoth is the relatively low silica content of 250 mg/L silica compared to most geothermal fluids having 500 ppm or more silica. Conventional methods for extracting silica are not effective for the Mammoth fluids due primarily to slow silica polymerization kinetics. A higher silica concentration is needed to allow efficient silica extraction.

For this reason, silica extraction work at Mammoth was carried out by first processing the fluid using reverse osmosis (RO). The RO unit provides a silica-enriched concentrate for silica and other metals removal, and a low TDS permeat. Mammoth Pacific is currently considering using low-salinity fluids for evaporative cooling during the warm summer months, and the RO permeate is being considered for this use. The reverse osmosis unit can be used to concentrate the silica to any desired level; high enough to allow rapid extraction, but not so high that the reverse osmosis membranes foul with precipitated silica. Silica concentrations of between 600 and 900 ppm appear to satisfy both constraints.

We tested silica extraction processes at Mammoth in a mobile laboratory using geothermal fluid obtained downstream from the power plant heat exchanger at 50-70° C. Applicants extracted silica in two forms for different markets: precipitated solid silica, and a colloidal silica slurry. When Applicants' goal was to precipitate silica, the concentrated fluid flowed through Applicants' continuously stirred reactor where chemicals, such as salts and polyelectrolytes, were added to induce silica precipitation. When Applicants' goal was to produce a colloidal silica slurry, colloids were concentrated from the fluids without inducing agglomeration. In both cases, the particles or unagglomerated colloids were removed downstream from the reactor in cross-flow ultrafilters The silica was characterized using a particle size analyzer, gas adsorption surface area measurements, digested for chemical analysis, and some samples sent to commercial laboratories for real product testing.

The goal of Applicants current work is to carry out pilot-scale (10-20 GPM) tests of silica recovery. These pilot tests are designed to optimize the three stages of the silica extraction process: (1) reverse osmosis (RO) treatment of the geothermal extraction fluid; (2) silica precipitation or colloid formation in a stirred reactor; and (3) silica separation through cross-flow filtration.

Applicants will carry out the silica extraction tests with a 20 gpm reverse osmosis unit, an 80 liter PPS-coated stirred reactor, a separation and filtration system, and a mobile field laboratory. Applicants' results should provide us with the process data needed for full-scale design calculations. Applicants estimate they will produce about 50 pounds per day of silica in Applicants' pilot process, and produce at least one metric ton of silica over the duration of the project. The overall goal is to generate a detailed optimized silica extraction process that has been validated by long-term testing.

Applicants have shown two marketable silica by-products, a solid precipitate and a colloidal slurry. For a process that treats and extracts silica from a 1.5 MGD fluid stream, sufficient to provide a permeate for evaporative cooling, the estimated capital costs are $2,300,000 and estimated operating costs are $700,000 per year. These estimates are based on cost data from the water treatment industry, embodied in a cost estimation program (WTCOST, I. Moch and Associates). The annual value of silica produced is $950,000, and low-salt water could be purchased for $150,000. The process thus provides about $400,000 net profit per year for the 1.5 MGD stream. These preliminary estimates suggest a rate of return of 14% and payout in 7 years. When normalized to a process that produces silica from the entire fluid flux at Mammoth Lakes of 18 MGPD, silica extraction could lower the cost of producing electrical energy by about 1.0 ¢/kW.

The present invention provides a method of producing silica from geothermal fluid. The geothermal fluid contains a low concentration of the silica of less than 275 ppm. The method includes the steps of treating the geothermal fluid containing the silica by reverse osmosis treatment thereby producing a concentrated fluid containing the silica, seasoning the concentrated fluid thereby producing a slurry having precipitated colloids containing the silica, and separating the silica from the slurry. In one embodiment the step of treating the geothermal fluid containing the silica by reverse osmosis treatment comprises treating the geothermal fluid containing the silica by reverse osmosis treatment thereby producing a concentrated fluid containing the silica at a concentration of between 600 and 900 ppm. In one embodiment the step of treating the geothermal fluid containing the silica by reverse osmosis treatment comprises using a reverse osmosis membrane to treat the geothermal fluid containing the silica and concentrating the silica at a concentration of between 600 and 900 ppm to avoid fouling the reverse osmosis membrane.

In one embodiment the step of seasoning the concentrated fluid comprises seasoning the concentrated fluid thereby producing a slurry having precipitated colloids containing the silica of a marketable size between 10-100 nm. In one embodiment the step of seasoning the concentrated fluid comprises seasoning the concentrated fluid by adjusting the pH of the concentrated fluid thereby producing a slurry having precipitated colloids containing the silica of a marketable size between 10-100 nm. In one embodiment the step of seasoning the concentrated fluid comprises seasoning the concentrated fluid by adding chemicals to increase silica polymerization thereby producing a slurry having precipitated colloids containing the silica of a marketable size between 10-100 nm.

In one embodiment the step of treating the geothermal fluid containing the silica by reverse osmosis treatment includes producing a fresh water by-product. In one embodiment the step of treating the geothermal fluid containing the silica by reverse osmosis treatment includes producing a fresh water by-product and wherein the fresh water by-product is used for evaporative cooling. In one embodiment the slurry contains metal and includes the step of removing the metal from the slurry.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of producing silica from geothermal fluid containing the silica, consisting of the following steps:
    selecting a source of geothermal fluid containing the silica wherein said source of geothermal fluid containing the silica contains only geothermal fluid containing a low concentration of silica wherein said low concentration of silica is less than 275 ppm silica,
    treating said geothermal fluid by reverse osmosis treatment by treating said geothermal fluid containing a low concentration of silica wherein said low concentration of silica is less than 275 ppm silica by said reverse osmosis treatment thereby producing a concentrated fluid containing the silica,
    seasoning said concentrated fluid containing the silica thereby producing a slurry having precipitated colloids containing the silica, and
    separating silica in said slurry by separating silica of a size between 10-100 nm from said slurry thereby producing the silica.

2. A method of producing silica from geothermal fluid containing silica and metal consisting of the following steps:
    selecting a source of geothermal fluid containing the silica and metal wherein said source of geothermal fluid containing the silica and metal contains only geothermal fluid containing low concentration of the silica wherein said low concentration of silica is less than 275 ppm silica and wherein the geothermal fluid contains the metal,
    treating said geothermal fluid by reverse osmosis treatment by treating said geothermal fluid containing a low concentration of silica wherein said low concentration of silica is less than 275 ppm silica by said reverse osmosis treatment thereby producing a concentrated fluid containing the silica and the metal from said geothermal fluid containing low concentration of the silica of less than 275 ppm and the metal by reverse osmosis treatment,
    seasoning said concentrated fluid containing the silica and the metal thereby producing a slurry having precipitated colloids containing the silica and the metal,
    separating 10-100 nm range size silica from said concentrated fluid containing the silica and the metal, and
    removing the metal from said slurry.

3. A method of separating colloidal silica from geothermal waters containing the silica, consisting of the following steps:
    selecting a source of geothermal waters containing the silica wherein said source of geothermal waters containing the silica contains only geothermal waters containing a low concentration of colloidal silica wherein said low concentration of colloidal silica is less than 275 ppm colloidal silica,
    treating said geothermal waters by reverse osmosis treatment by treating said geothermal waters containing the colloidal silica of less than 275 ppm by said reverse osmosis treatment thereby producing a concentrated fluid containing the colloidal silica, seasoning said concentrated fluid thereby producing a slurry having precipitated colloids containing the colloidal silica, and separating the colloidal silica in said slurry by separating silica of a size between 10-100 nm from said slurry wherein said separated colloidal silica has a concentration of 12-40 wt %.

* * * * *